Sept. 1, 1959  B. G. DAHLBERG  2,902,156
CENTRIFUGAL SCREENS
Filed March 18, 1957  2 Sheets-Sheet 1

INVENTOR
BENGT GEORG DAHLBERG
By Irwin S. Thompson
ATTY.

Sept. 1, 1959

B. G. DAHLBERG 2,902,156

CENTRIFUGAL SCREENS

Filed March 18, 1957

INVENTOR
BENGT GEORG DAHLBERG
By Irwin S. Thompson
ATTY.

United States Patent Office 2,902,156
Patented Sept. 1, 1959

2,902,156

CENTRIFUGAL SCREENS

Bengt Georg Dahlberg, Alfredshem, Sweden

Application March 18, 1957, Serial No. 646,818

Claims priority, application Sweden March 22, 1956

4 Claims. (Cl. 210—109)

The present invention relates to a method of, and means for controlling the amount of reject in the operation of centrifugal screens for screening fiber suspensions.

In the following description and the appended claims, the pulp supplied will be termed "charged stock," the pulp passing through the screen will be termed "accepted stock," and the overflowing pulp will be termed "rejected stock" or simply "reject."

In the operation of centrifugal screens for screening fiber suspensions there should always be a certain amount of overflow or reject which is separated from the fiber suspension.

If the amount of reject obtained is too small this would indicate that the charge is insufficient. It is then possible, within certain limits, to regulate the amount of reject by reducing or increasing the amount of spray water and/or diluting water supplied to the screen. However, this is not enough, under all circumstances, to obtain an accepted stock of high quality.

In accordance with the present invention it is proposed, in order to control the amount of rejected stock from centrifugal screens, to increase or reduce, respectively, the effective screening plate area of the screen in the course of the operation. In this way it is possible to control the capacity of the screen, and thus also the amount of reject, at will, and possibly automatically.

The arrangement for carrying the method into effect essentially consists therein that there is arranged in the space between the outer casing and the screening plate of the centrifugal screen, and extending along a suitable portion of the screening plate surface, a member which is movable towards and away from said plate surface and by which the capacity of the screen may be varied.

To elucidate the invention, reference is made to the accompanying drawing which illustrates diagrammatically an embodiment thereof by way of example, and in which.

Figure 1:
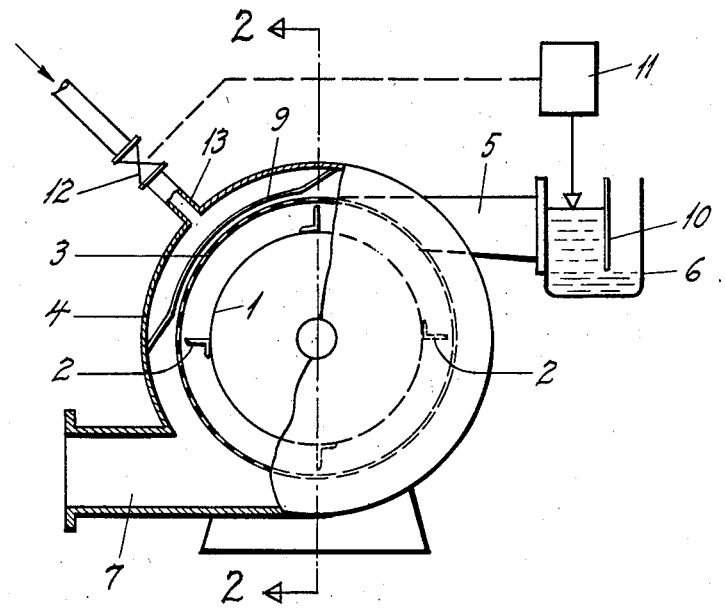
Fig. 1 is a partial cross-section through a centrifugal screen taken on line 1—1 of Fig. 2 for screening fiber suspensions and embodying the present invention.
Figure 2:
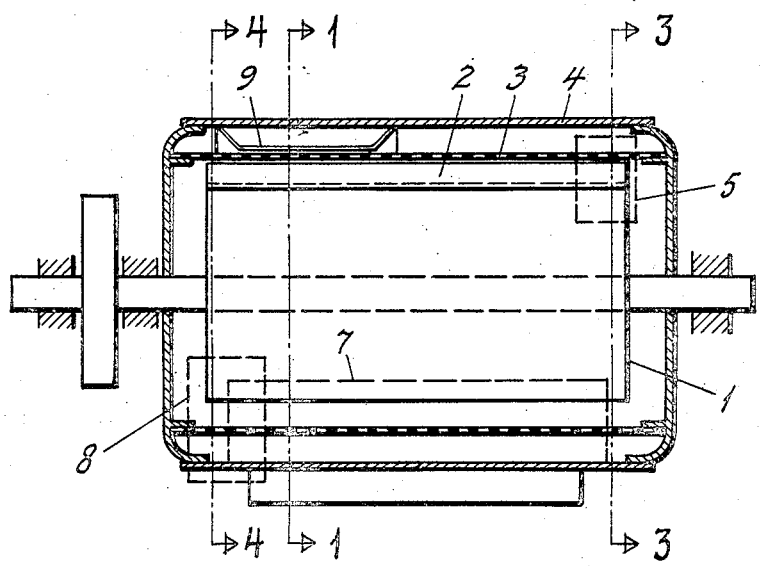
Fig. 2 illustrates a corresponding longitudinal section through the apparatus, taken on line 2—2 of Fig. 1.
Figure 3:
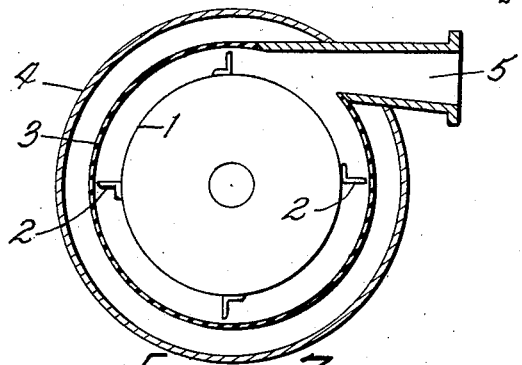
Fig. 3 is a vertical sectional view taken on line 3—3 of Fig. 2.
Figure 4:
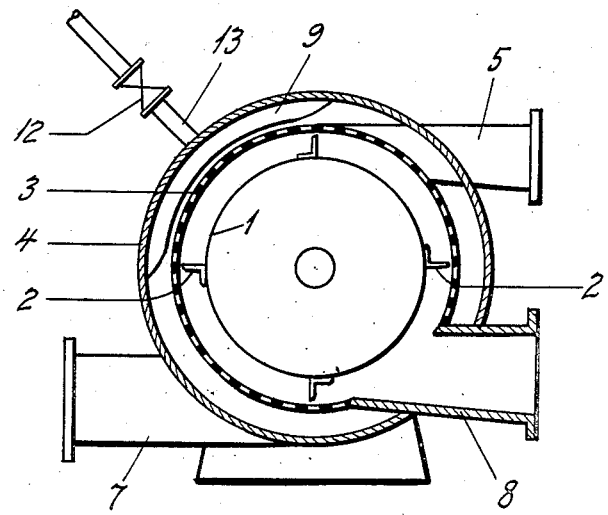
Fig. 4 is another vertical sectional view taken on line 4—4 of Fig. 2.

By numeral 1 is designated a closed rotary drum carrying throw-off ribs 2 which throw the pulp suspension against a stationary cylindrical screening plate 3 surrounding the drum in spaced relation thereto and being closed at its ends. The outer casing or housing of the centrifugal screen is designated by 4, a feed connection for the unscreened pulp at one end of the casing is designated by 8, a discharge connection for the rejected stock at the other end of the casing is designated by 5, and a discharge connection for the accepted stock is designated by 7. The discharge connection 5 opens into a discharge chute 6 for the reject. The structure of the centrifugal screen so far described is that commonly practiced and therefore would need no detailed description.

Secured to the inner surface of the cylindrical wall of the outer casing 4 so as to be disposed between this wall and the screening plate 3 is a flexible diaphragm 9 made of rubber, for instance, which diaphragm extends over a suitable portion of the peripheral surface of the screening plate. As an alternative to this diaphragm it would be possible also to use a curved plate secured to the inner surface of the cylindrical casing wall 4 by resilient means so as to enable the same to be moved towards and away from the screening plate 3. The space delimited by the member 9 and the casing wall 4 communicates through a conduit 13 provided with a valve 12 with a source of air or liquid under pressure so that, by admitting such pressure fluid into the chamber, it is possible to move the member 9 from a position adjacent the outer casing wall 4 towards the screening plate 3, as indicated in Fig. 1, and thus possibly completely obturate a certain surface area of this plate.

The size of the diaphragm or plate 9 should be so chosen that a suitably limited range of rates of delivery is obtained. When the screen is under full load and its amount of reject is suitable, the diaphragm or plate 9 will be situated close to the casing wall 4 in which position it does not influence the operation of the screen. If, on the other hand, the capacity of the screen is not fully utilized, and too small an amount of reject is obtained, then the regulating member 9 is approached to the screening plate whereby the capacity of the screen is reduced, possibly by causing the diaphragm or plate 9 to obturate completely a co-extensive area of the screen plate 3.

The regulation can suitably be effected automatically in response to the amount of reject which is caused to generate an impulse serving to actuate the valve 12.

The arrangement for this purpose may comprise, for instance, a vertically slidable shutter 10 disposed in the discharge chute 6 for the reject, this shutter being adjusted to a desired position so as to provide for a predetermined discharge level. If this level remains constant, then the amount of reject discharged per unit time is constant also. Upon a tendency of the pulp level to change an impulse will be emitted to a regulator 11 of any suitable conventional type which acts through the valve 12 to displace the diaphragm or plate 9 whereby the capacity of the screen is changed so as to cause the amount of reject to remain constant.

Figure 5:
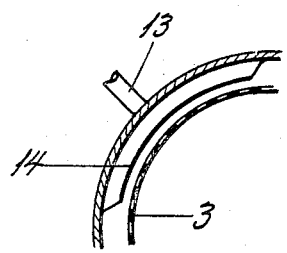
Fig. 5 is a fragmentary cross sectional view similar to that of Fig. 1.

Fig. 5 shows part 9 in a similar cross section as Fig. 1 with the regulating surface of the diaphragm designated by 14.

Various modifications of the arrangement are conceivable within the scope of the appended claims. The movements of the regulating member 9 away from and towards the screen plate 3 could be controlled also by purely mechanical means, of course.

What I claim is:

1. A centrifugal screen apparatus for screening fiber suspensions and comprising an outer casing, a closed cylindrical drum mounted in said casing for rotation around its axis and having on its peripheral surface projecting throwing ridges, a cylindrical screening member fixedly mounted between said outer casing and said closed drum in spaced relation thereby providing a first annular space between said closed drum and said screening member on one hand and a second annular space between said screening member and said outer casing on the other hand, an inlet extending through said outer casing and through said screening member for delivering fiber suspension to be screened into said first annular space at one end thereof, a first outlet extending through said screening member and said outer casing for discharging reject stock from said first annular space at the end axially opposite to said inlet, a second outlet extending from said outer casing for discharging accepted stock from said second annular space, and a regulating member having a regulating surface movable in said second annular space towards and away from the outer surface of said screening member so as to decrease and increase a passage formed between said regulating surface and the outer surface of said screening member and to influence stock current passing through the portion of the screen located in front of said regulating surface.

2. A centrifugal screen according to claim 1, wherein said regulating member is a flexible diaphragm secured to the inner surface of said outer casing so as to confine a space containing a fluid, the pressure condition of said fluid determining the volume of said confined space and thus the position of said flexible diaphragm relatively to said screening member.

3. A centrifugal screen according to claim 1, wherein said regulating member is a plate connected to the inner surface of said cylindrical casing by resilient means so as to enable the same to be moved towards and away from said screening member.

4. A centrifugal screen according to claim 1 comprising means responsive to the outflow of reject stock through said first outlet to move said regulating surface towards and away from said screening member.

References Cited in the file of this patent

UNITED STATES PATENTS

| | | |
|---|---|---|
| 1,722,874 | Wells | July 30, 1929 |
| 1,973,864 | Biffar | Sept. 18, 1934 |